United States Patent [19]

Hoag

[11] Patent Number: 4,686,685
[45] Date of Patent: Aug. 11, 1987

[54] GAS LASER HAVING THERMALLY STABLE OPTICAL MOUNT

[75] Inventor: Ethan D. Hoag, East Boston, Mass.

[73] Assignee: Laser Corporation of America, Lowell, Mass.

[21] Appl. No.: 741,756

[22] Filed: Jun. 6, 1985

[51] Int. Cl.$^4$ .............................................. H01S 3/08
[52] U.S. Cl. ................................................. 372/107
[58] Field of Search ........................... 372/55, 58, 107

[56] References Cited

U.S. PATENT DOCUMENTS 4,099,143  7/1978  Foster ................................... 372/58

Primary Examiner—Gene Wan

[57] ABSTRACT

A laser of the flowing gas type employs an optical resonator having mirrors at each end of the lasing region which are supported, without a separate optical bench, by a hollow cylindrical gas-tight housing. Enclosed in the housing are a pump for circulating the gas, electrodes for causing lasing of the flowing gas, and heat exchangers for cooling the gas. Those enclosed structures are subject to thermal expansion and contraction and are hung between a pair of plates. One of those plates is affixed to one end of the housing while the other plate is free to move within the housing so that thermal expansion and contraction of the enclosed structures does not place an appreciable stress on the housing. A heat shield is disposed between the hung structures and the inside wall of the housing to provide a barrier to the transmission of heat to the housing and the housing is liquid cooled to stabilize its temperature. The mirrors of the optical resonator are mounted on rings attached to each end of the housing. Apertures are provided in the plates to provide windows for the passage of light reflected between the mirrors of the optical resonator. At least one of the mirrors is mounted so that its alignment can be adjusted without opening the gas tight housing.

4 Claims, 12 Drawing Figures

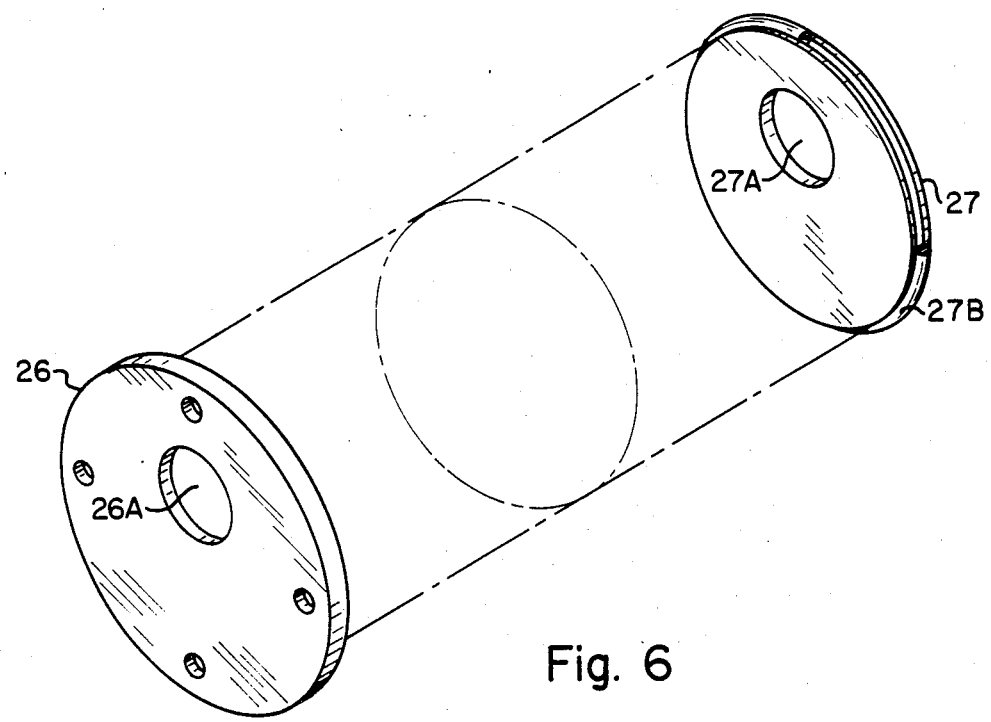
Fig. 6
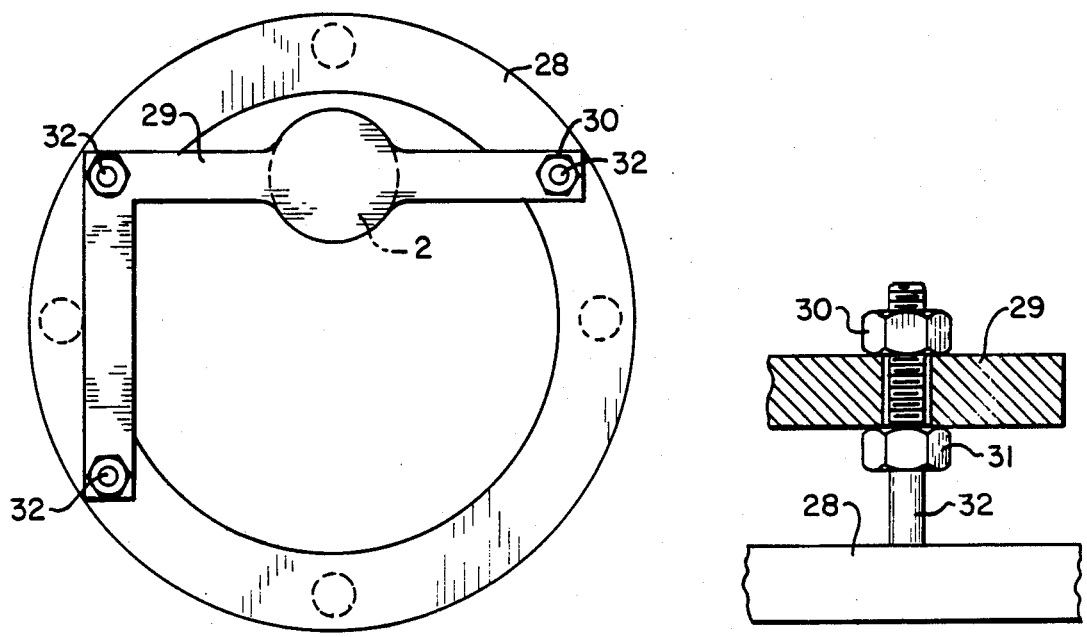
Fig. 7
Fig. 8

4,686,685

GAS LASER HAVING THERMALLY STABLE OPTICAL MOUNT

FIELD OF THE INVENTION

This invention relates in general to lasers of the type utilizing a gas as the lasing medium. More particularly, the invention relates to gas lasers of the kind whose length is reduced by the employment of a folded optical resonator. The invention resides in an improvement that enables the optics of the folded resonator to be supported by the housing of the laser without requiring a separate optical bench while permitting the housing to be also used as a gas tight partially evacuated enclosure that supports other internal components of the laser which are subject to thermal contraction and expansion.

BACKGROUND OF THE INVENTION

In a laser of the type employing a flowing gas as the lasing medium, the gas is passed through a discharge cavity where an electric field causes an electric discharge in the gas that produces an emission of light. The lasing of the gas causes the gas to become very hot and the gas flowing out of the discharge cavity, therefore, is at a much higher temperature than the gas entering the discharge cavity. In a closed system where the gas is recirculated, the hot gas from the discharge cavity flows to a heat exchanger where the gas is cooled to restore the population inversion of the gas molecules to an appropriate level that again permits the stimulation of lasing.

In gas lasers of the kind employing $CO_2$ mixed with $N_2$ and $H_2$ as the gas lasing medium, for example, the appropriate length for a straight stable resonant cavity is about 10 meters. Because that length, in many instances, is inconvenient or exceeds available space, the length of the laser has been appreciably reduced by optically folding the resonant cavity. In a folded optical resonator, the length of the cavity is reduced by reflecting the beam between mirrors situated at the ends of the folded cavity. For a folded optical resonator to be effective, precise spacing of the mirrors and their alignment must be accurately maintained.

Because of the heating and cooling of the gas that occurs in the operation of a flowing gas laser, the thermal expansion and contraction of the laser structure makes it difficult to find a stable support for the optical elements of the laser's resonant cavity. Consequently, in flowing gas lasers of moderate or high power, it has been customary to support the optical elements of the resonant cavity on a separate optical bench within or extending through the laser housing.

A flowing gas laser having a separate bench for the support of the optical elements of the laser's resonant cavity is described in U.S. Pat. No. 3,808,553. In that patented arrangement, the bench is constituted by spacer rods made of a material such as Invar steel that has relatively low thermal expansion. The Invar rods are encased in copper heat shields that act to keep the temperature of the spacer rods sufficiently uniform so that thermal expansion of the rods is negligible. The mirrors of the laser's resonant cavity are supported by the spacer rods in a manner such that the spacing between the mirrors is substantially invariant despite the thermal conditions in the laser's housing.

U.S. Pat. No. 4,099,143 describes a flowing gas laser having a gas tight hollow cyclindrical housing enclosing a blower, a heat exchanger, and means forming a discharge region, together with baffles and vanes for causing the gas to flow in a closed loop. The mirrors of the laser's resonant cavity are situated outside the housing and are supported by an optical bench having spacer rods that extend through the housing. To preserve the gas tight integrity of the housing while maintaining precisely accurate spacing between the mirrors despite the thermal expansion and contraction of the laser's housing, the mirrors of the resonant cavity are connected to the housing by bellows and the rods of the optical bench are arranged so that they are not affected by the thermal expansion and contraction of the housing.

The use of a separate bench to support the optical elements of the laser's resonant cavity has a number of drawbacks where weight, compactness, reliability, and cost of the laser are important considerations. In an arrangement, such as described in U.S. Pat. No. 4,099,143, where the rods of the optical bench extend through the laser's housing, the rods must be supported in a manner that preserves the gas tight integrity of the housing while allowing the housing to expand and contract without affecting the rods. The provision of reliable long lasting seals between the rods and the housing then becomes a problem. The rods and heat shields of the optical bench described in U.S. Pat. No. 3,808,553 occupy a considerable amount of space around the discharge cavity and add substantially to the complexity of the structure within the housing inasmuch as the rods must themselves be supported in a manner that does not affect their physical dimensions. The rods and their associated heat shields and support structure add an appreciable amount of weight to the laser. Further, the rods and their associated heat shields and support structure add to the cost of the laser both in material costs and in assembly costs.

OBJECTIVES OF THE INVENTION

The principal objective of the invention is to eliminate the need for a separate optical bench in a flowing gas laser by employing the laser's housing to support the optics of the resonator while also utilizing the laser's housing to support other structures within the housing that are subject to thermal contraction and expansion.

Another objective of the invention is to provide a gas tight laser housing in which the mirrors of the resonator are supported by the laser's housing in a manner permitting alignment of the mirrors to be adjusted without requiring the laser housing to be opened.

A further objective of the invention is to provide a compact flowing gas laser of moderate power having a gas tight housing in which are situated all the major components of the laser except the power supply and the cooling water supply.

Another objective of the invention is to provide a flowing gas laser having a temperature stabilized housing whose physical dimensions are sufficiently invariant to enable the housing to be used as an optical bench.

THE INVENTION

The invention resides in employing a hollow metal cylinder to house the internal elements of the gas laser and minimizing mechanical stresses imposed on that housing by the thermal expansion and contraction of the internal structures by anchoring those structures at one end of the housing and attaching the other end of those internal structures to a support that is free to slide within the housing. By that arrangement, both ends of the internal structures are supported by the housing without imposing mechanical stresses on the housing from the thermal expansion and contraction of the internal structures. The mirrors of the laser's optical resonator are supported on mounts attached to the housing in a manner such that the expansion and contraction of the internal structures do not affect the mirror mounts. To stabilize the temperature of the housing, the heat generated internally in the housing by lasing of the gas is removed by water cooling.

THE DRAWINGS

FIG. 1 is a perspective view of the gas tight enclosure employed in the invention.

FIG. 2 schematically depicts the arrangement of the optical elements of a cavity resonator of the kind employed in a flowing gas laser.

FIG. 6 is a schematic view showing the two rings between which are hung the thermally expansible internal structures of the laser.

FIG. 7 depicts the arrangement that supports one of the folding mirrors of the laser's optical resonator.

FIG. 8 shows an arrangement permitting adjustment of the L-shaped frame in FIG. 7 that carries the folding mirror.

DETAILED DESCRIPTION OF PREFERRED EMBODIMENT

Figure 1:
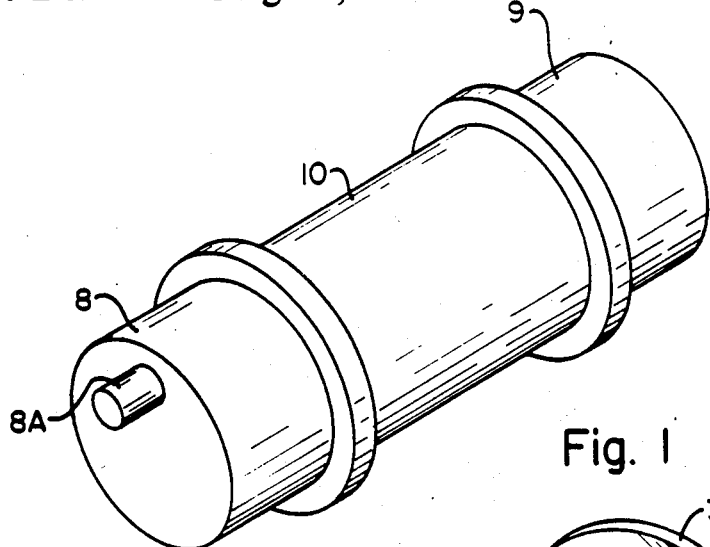

Referring now to FIG. 1 of the drawings, there is shown a laser whose internal structures are situated in a gas tight enclosure formed by a hollow cylindrical housing 20 that is closed at one end by a cap 8 and is closed at its other end by a cap 9. Extending through end cap 9 are flexible hoses through which water, from an external supply, flows to provide coooling within the housing. Also extending through end cap 9 are flexible electrical conductors which provide external connections to the electrodes and other devices within the housing. Protruding from end cap 8 is a tube 8A in which is mounted the output window through which the laser beam passes out of the gas tight enclosure.

Figure 2:
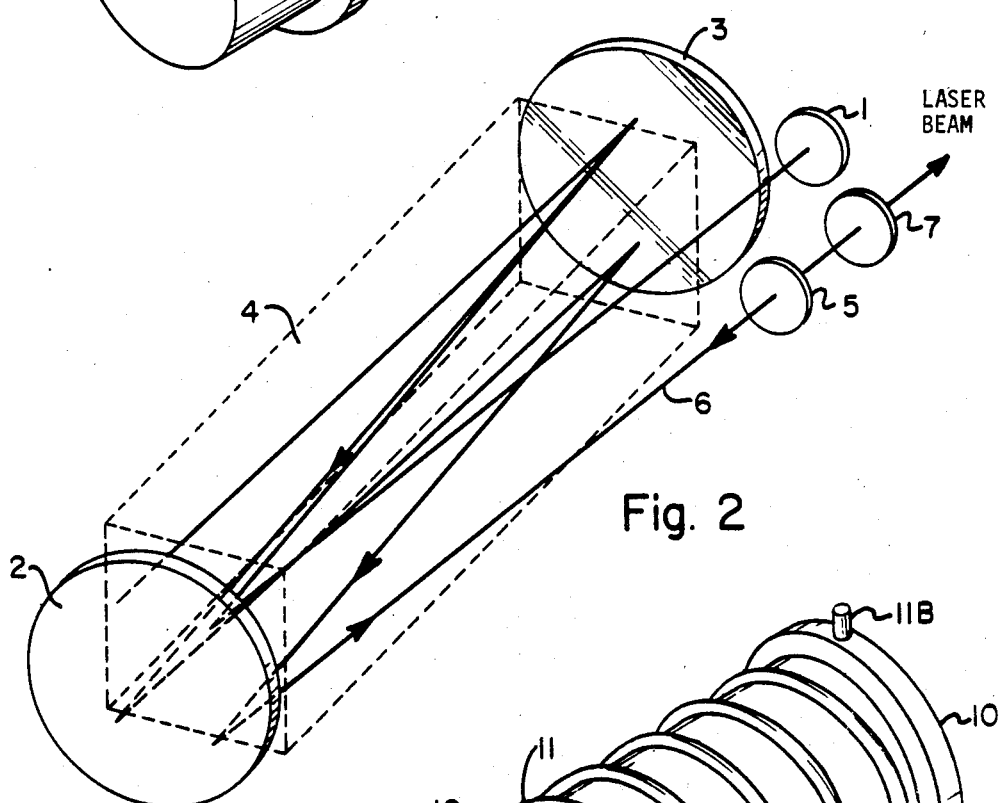

FIG. 2 of the drawings shematically shows the arrangement of the optical elements of a stable optical resonator of the kind employable in a gas laser. That type of resonator employs a primary mirror 1 having a concave reflecting surface that directs light toward the flat reflecting surface of a folding mirror 2. Folding mirror 2 is disposed adjacent one end of lasing region 4 and faces another flat folding mirror 3 situated adjacent the other end of the lasing region. Disposed near the periphery of folding mirror 3 is a flat feedback mirror 5 that is partially transmissive and allows about 40% of incident light energy to pass through it while reflecting the other 60% of the light energy back to folding mirror 2.

In the operation of the laser, a gaseous medium, such as a mixture of $CO_2$, $N_2$, and He, having a population inversion of energy states, is caused to flow through the lasing region 4. In that region, radiation is amplified by laser action. A ray of radiation 6 reflected from the primary mirror, for example, moves along the path indicated in FIG. 1 where it is reflected back and forth between the folding mirrors. At a point in its travel, the ray is reflected from folding mirror 2 toward the feedback mirror where it either passes through to an output window 7 and emerges as output radiation in a laser beam or the ray is reflected back to folding mirror 2 and retraces its path back to the primary mirror where it is again reflected to travel the same path to the feedback mirror. The optical arrangement is termed a "stable" resonator. In this type of resonator, various techniques are known for suppressing unwanted modes that arise in the optical resonator.

From the path of the ray, it can be appreciated that the mirrors are angularly disposed with respect to one another so that the reflecting surfaces of the flat mirrors are not parallel. The angularity of the mirrors is critical and must be maintained unchanged to preserve proper operation of the laser. The distance between mirrors is less critical and some variation in that spacing can be tolerated provided that the angular alignment of the mirrors is not disturbed.

It is essential to the operation of this type of optical resonator as well as to other kinds of optical resonators that the angular alignment of the mirrors be precisely fixed despite the changing thermal environment within the housing of the laser. For that reason, it has been conventional to support the optical elements of the resonator on a separate optical bench having spacer elements whose coefficient of thermal expansion is very low so that the physical length of the spacer elements is substantially invariant.

Figure 3:
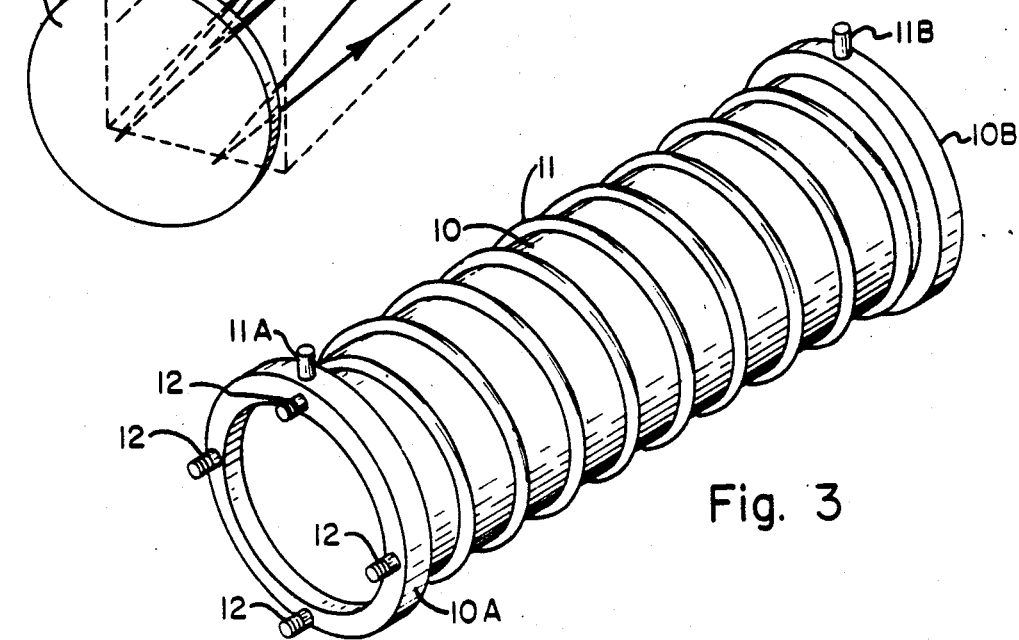
FIG. 3 is a perspective view of the water cooled hollow cyclindrical housing employed in the invention.

Turning now to FIG. 3, there is shown a hollow cylindrical housing 10 of the kind employed in the invention as the optical bench to support the optical elements of the laser's optical resonator. The cylindrical housing, at each end has a flange 10A and 10B to which rings are secured that support the optical elements of the resonator. The housing can be made of aluminum and if it is, the inner and outer cylindrical surfaces of the housing are preferably anodized to provide a hard, scratch resistant coating. Spirally wound around the outer cylindrical surface of the housing is a copper tube 11 through which water flows to cool the housing and maintain its temperature substantially constant. For added strength, the inlet 11A to tube 11 is preferable mounted on the flange 10A and the outlet 11B is preferably mounted on the flange 10B.

Extending from the end face of flange 10A are studs 12 for securing a ring (shown in FIG. 9) that supports frames on which are mounted the primary and feedback mirrors and one of the folding mirrors of the laser's optical resonator. Situated at the other end of housing 10 is another ring (shown in FIG. 7) that supports the other folding mirror of the optical resonator.

Figure 4:
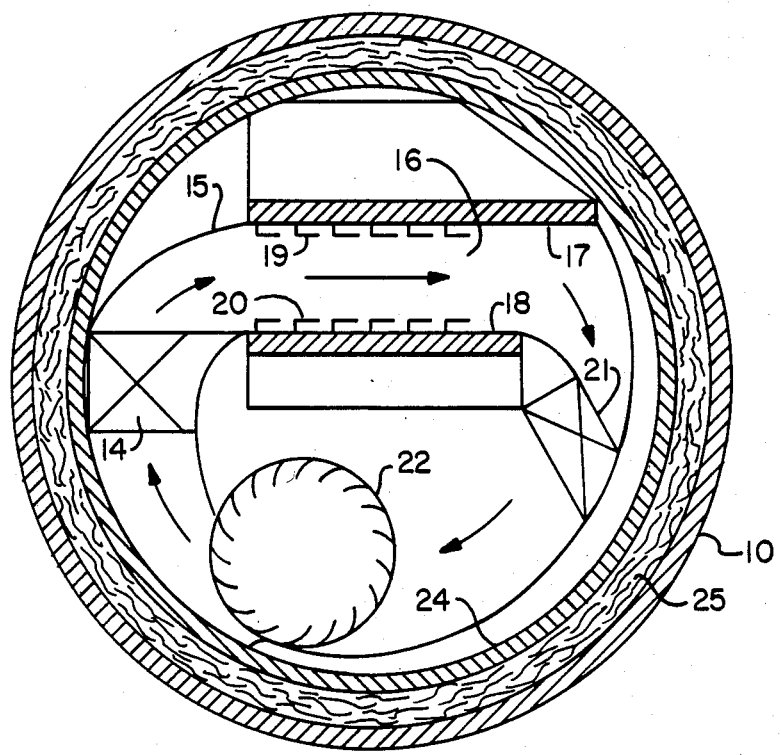
FIG. 4 is a view schematically showing the structural arrangement within the housing of the laser.

Referring now to FIG. 4 of the drawings which schematically shows the structural arrangement inside the cylindrical housing 10 of the laser, there is shown an upstream heat exchanger 14 connected by flow directing baffles 15 to the electrical discharge region 16. The gas flowing through the upstream heat exchanger enters the discharge region 16 that is situated between two dielectric plates 17 and 18 made of a ceramic material such as cordierite which has a low coefficient of expansion and which can withstand high temperatures. Rows of electrodes 19 and 20 extend through the plates 17 and 18 and establish an electric field that causes the gas in the discharge region to lase. The hot gas leaving the discharge region then flows through a downstream heat exchanger 21 which cools the gas to restore the population of gas molecules to the appropriate levels for again permitting the stimulation of lasing by the gas. The cooled gas then flows to the inlet of a blower 22 which can be a device of the type commonly known as a squirrel cage blower. The blower accelerates the gas and in doing so heats the gas. The upstream heat exchanger 14 then removes the heat introduced by the blower.

The heat exchangers may be of any convenient type, such as the conventional kind which has water cooled tubes with a multitude of fins that increase the effective heat exchange surface area. The path of the gas flow in the FIG. 4 arrangement is indicated by arrows and it is evident that the gas circulates in a closed loop.

To insulate the housing 10 from the thermal environment existing inside the housing, a heat barrier is interposed between the interior surface of the housing and the structure inside the housing. The barrier is formed by a water cooled copper heat shield 24 that forms a cylinder surrounding the internal structure and a fiberglass batting 25 overlaying the copper heat shield.

Figure 5:
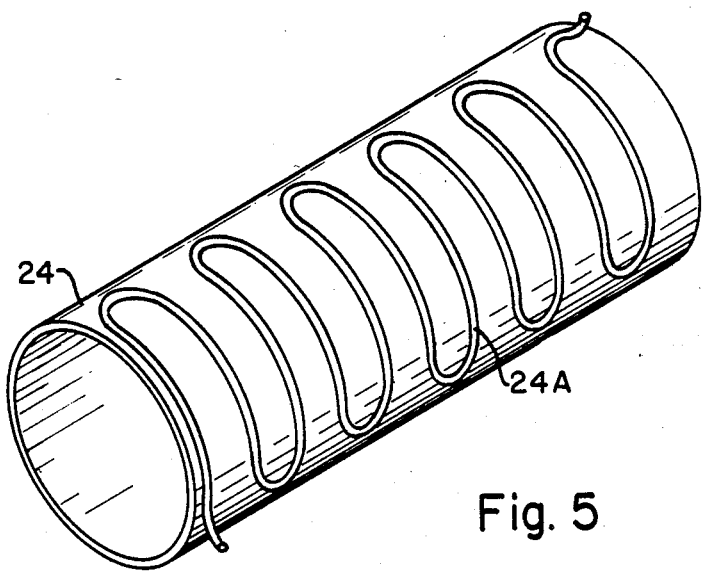
FIG. 5 is a perspective view of the water cooled copper heat shield.

The heat shield 24 as shown in FIG. 5, is a plate of copper that has been rolled into a cylinder and to which undulating copper tubing 24A has been attached. Water flowing through the tubing removes much of the heat from the copper shield. The fiberglass batting 25 is disposed around the copper heat shield and further insulates the housing from the heat generated in the interior of the laser. The fiberglass batting is sufficiently porous to trap some of the gas in the housing and that trapped gas further impedes the transfer of heat through the batting to the aluminum housing. Consequently, the cylindrical aluminum housing is so well insulated that the water cooling of that housing effectively maintains the housing at a uniform temperature throughout its entire extent.

The two heat exchangers 14 and 21, the blower 22, the electrodes and their ceramic supports 17 and 18, and the baffles confining the gas flow are all subject to thermal expansion and contraction. To prevent expansion and contraction of those structures from affecting the hollow cylindrical housing 10, those structures, as indicated in FIG. 6, are hung between two plates 26 and 27. In FIG. 6, the broken lines indicate the zone in which the internal structures in the laser housing are hung between the plates 26 and 27. The outer diameter of plate 27 is smaller than the interior diameter of housing 10 so that plate 27 is able to slide within the housing. To inhibit heat transfer from plate 27 to the housing, an O-ring 27B, composed of a material that is a relatively poor heat conductor, is disposed around the periphery of the plate. Plate 26 is of larger outer diameter than the internal diameter of the housing and in the assembled laser that plate is attached to the flange 10A of the housing by bolts. By that arrangement, all the interior structures which are subject to thermal expansion and contraction, are able to change their dimensions without affecting the housing because the plate 27 is able to slide in the housing in accommodation of those dimensional changes. Plate 26 has in it an aperture 26A which is aligned with an aperture 27A in plate 27. Those apertures permit the passage of light reflected between the mirrors of the laser's optical resonator. It is evident that the support elements 26 and 27 need not be plates and that those elements can be configured so as to not interfere with passage of light reflected between the mirrors of the laser's resonator.

Referring now to FIG. 7, there is shown a mirror support ring 28 that, in the assembled apparatus, is attached to the flange 10B of the housing by means of studs or bolts 28A. The folding mirror 2 is mounted on an L-shaped frame 29 in a manner permitting adjustment of the height of the ends of the arms of the L-shaped frame 29 and adjustment of the height at the junction of those arms. For that purpose, the ring carries three upright threaded studs 32 which extend through the frame 29. As indicated in FIG. 8, two nuts, 30 and 31, on the stud 32, clamp the frame between them. The aperture in the arm of the frame is slightly larger than the external diameter of the stud 31 to provide adjustment space.

Figure 9:
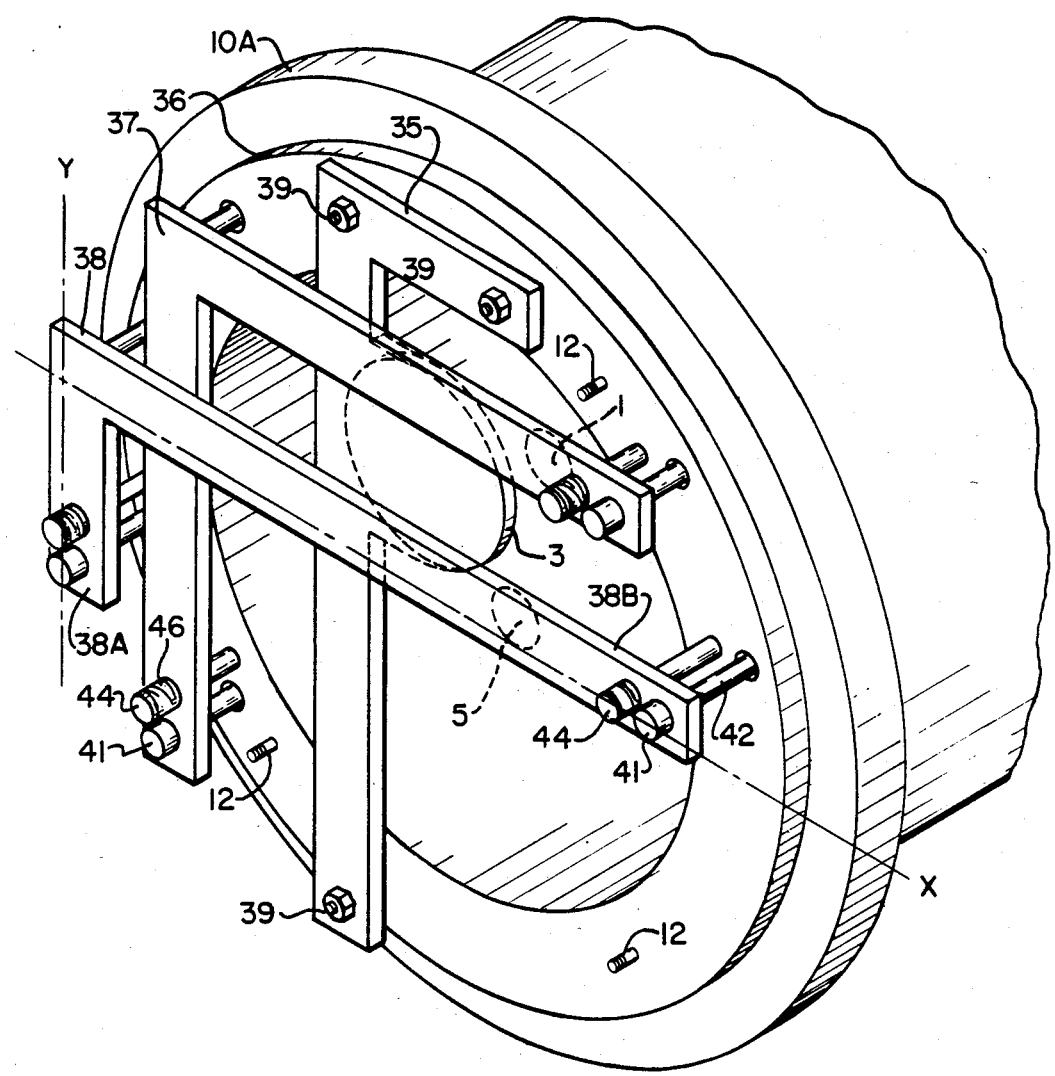
FIG. 9 depicts the arrangement that supports the primary, feedback, and the other folding mirror of the laser's optical resonator.

Referring now to FIG. 9, the other folding mirror 3 of the laser's resonant cavity is mounted on an L-shaped member 35 carried by a ring 36. In the assembled apparatus, the ring 36 is attached to the flange 10A of the housing by means of the studs 12. The L-shaped member 35 is supported on three studs 39 in the manner previously described in connection with the L-shaped frame 29. The primary mirror 1 is mounted on an L-shaped frame 37 that overlies and is spaced from member 35. The feedback mirror 5 is mounted in an aperture in an L-shaped frame 38 that overlies and is spaced from frame 37. That arrangement enables light to pas through the partially transmissive feedback mirror and through the output window 7 (shown in FIG. 11) to emerge as the laser's output beam. The L-shaped frames 37 and 38 are mounted on ring 36 in a manner permitting each of those frames to pivot around two orthogonal axes. Because frames 37 and 38 are mounted on ring 36 in identical fashion, only the mounting of frame 38 is here described in detail.

Figure 10:
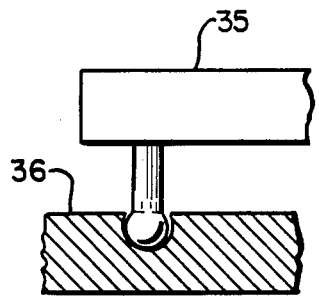
FIG. 10 shows the ball and socket connection that allows pivotal action of the frame carrying the feedback mirror.

Referring again to FIG. 9, the L-shaped frame 38 is mounted on ring 36 in a manner permitting frame 38 to pivot about the X—X axis which extends along one of its arms without appreciably affecting its disposition on the Y—Y axis which extends along the other arm, and vice versa. To permit that pivoting action, the junction of the arms of the L-shaped member, as shown in FIG. 10, has a post carrying a ball that is received in a socket in the ring 36. Because the ends of the two arms 38A and 38B of the L-shaped member are arranged in the identical manner to enable their height above the ring 36 to be adjusted, the arrangement at only one of them is here described in detail.

Figure 11:
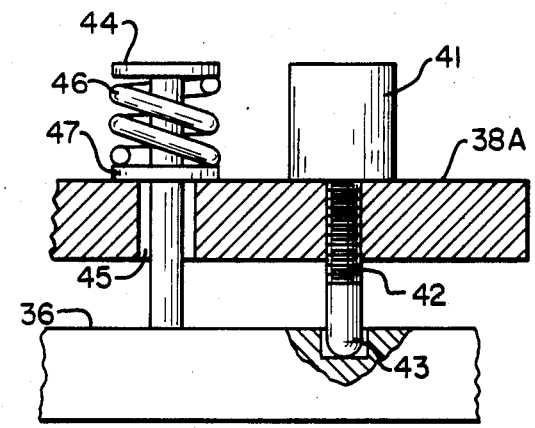
FIG. 11 shows the arrangement at the end of an arm of the L-shaped frame for adjusting the alignment of the feedback mirror.

Referring now to FIG. 11, a small electric motor 41 is mounted adjacent the end of the arm of member 38A. The motor is of the reversable type and is arranged to turn a screw 42 that is threaded in the arm 38A. The end of the screw is rounded and is disposed in a groove 43 in the ring 36. To bias the arm 38A toward the ring 36, a bolt 44, anchored in the ring 36, extends through a slot 45 in the arm 38A. A helical spring 46 is disposed between the head of bolt 44 and a washer 47. The spring 46 forces arm 38A downwardly, as viewed in FIG. 10, and thereby keeps screw 42 bottomed in groove 43.

By turning screw 42, the height of the end of arm 38A above ring 36 is changed and arm 38B is thereby caused to rotate about the X—X axis. That action causes the alignment of the feedback mirror to be altered without appreciably affecting its spacing from folding mirror 2. The alignment of the feedback mirror can be further adjusted by causing the arm 38A to rotate about the Y—Y axis.

In the assembly of the laser, the internal structures are hung between the plates 26 and 27, the copper heat shield 24 is placed around the hung structures and the fiberglass batting is wrapped around the heat shield. The plate 27 is then inserted in the hollow of the cylindrical housing and the assembly is inserted into the housing until plate 26 bears against the face of flange 10A by bolts or other means. The plate 26 is then secured to the flange 10A.

Figure 12:
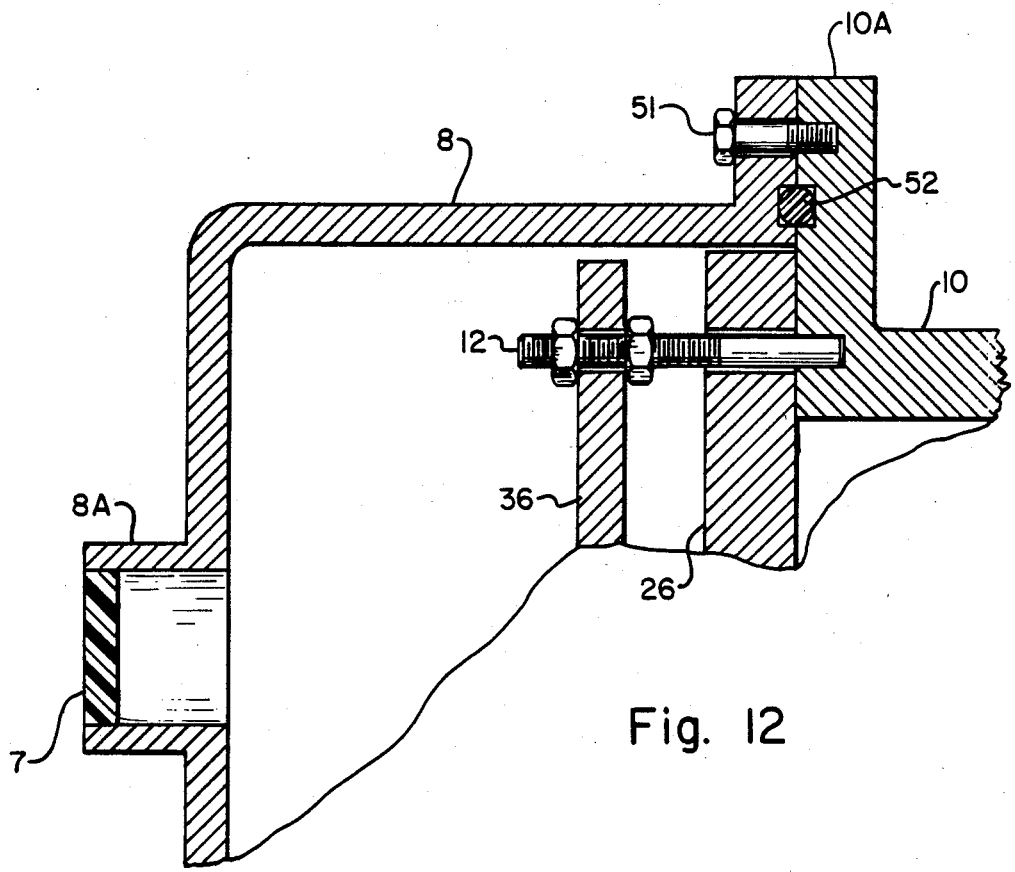
FIG. 12 is a detailed view of an arrangement in the laser housing.

Referring now to FIG. 12, plate 26 is provided with holes that enable the studs 12 to protrude through with enough clearance so that the studs do not contact the plate 26. The space around the stud 12 serves as a heat barrier to prevent the plate from heating the studs. The ring 36 is then secured on the studs 12 with the plate 26 interposed between the ring 36 and the flange 10A. To inhibit heat transfer from plate 26 to ring 36, the ring is spaced from the plate by securing the ring between nuts on the studs. After ring 28 has been secured to the flange 10B at the opposite end of the housing, adjustments are made to align the mirrors for proper optical resonance. The entire assembly is then made gas tight by capping the ends of the housing.

As shown in FIG. 12, end cap 8 is secured to the flange 10A of housing 10 by bolts 51. An O-ring 52 is employed to seal the joint between the end cap and the flange 10A. The window 7 through which the beam passes is situated in the tube 8A that extends from the end wall of the cap. The other end of the housing is capped in similar manner by the cap 9.

Inasmuch as the invention can be embodied in various forms, it is not intended that the scope of the invention be limited only to the embodiment here described. Rather, it is intended that the scope of the invention be construed in accordance with the appended claims, having due regard for obvious changes that do not alter the essential features of the invention.

I claim:

1. A flowing gas laser comprising
   (a) an optical resonator having a plurality of mirrors,
   (b) a hollow cylindrical housing,
   (c) means for maintaining the housing at a substantially constant temperature by the circulation of a cooling fluid,
   (d) a pair of supports, one of the supports being affixed to the housing and the other support fitting within the hollow of the cylindrical housing and being movable therein,
   (e) a plurality of structures for causing lasing of the flowing gas and circulation of the gas within the housing, the plurality of structures being hung between the pairs of supports and situated internally of the housing,
   (f) a first mount attached to one end of the housing, the first mount supporting one mirror of the laser's optical resonator, and
   (g) a second mount attached to the housing and supporting another mirror of the laser's optical resonator, the two mirrors being positioned at opposite ends of the laser's optical resonator.

2. The gas laser according to claim 1, further comprising
   (h) means sealing the housing at its ends and forming therewith a gas tight enclosure.

3. The gas laser according to claim 1, further comprising
   (h) means forming an internal barrier to the transmission of heat to the housing, the heat barrier surrounding the plurality of internal structures hung between the supports.

4. The gas laser according to claim 1, wherein the means in the housing forming an internal heat barrier comprises
   (i) a metallic heat shield surrounding the plurality of internal structures hung between the supports,
   (ii) means for cooling the heat shield by circulation of cooling fluid, and
   (iii) a batting overlying the heat shield, the batting being porous and adapted to trap gas present in the housing.

* * * * *